April 15, 1930.  W. M. JOHNSTON  1,755,008

CURVED SEED BOARD FOR COTTON GINS

Filed April 8, 1929

Inventor
W. M. Johnston
By Mason Fenwick & Lawrence
Attorneys

Patented Apr. 15, 1930

1,755,008

UNITED STATES PATENT OFFICE

WILLIAM MAURICE JOHNSTON, OF AMITE, LOUISIANA, ASSIGNOR TO GULLETT GIN COMPANY, OF AMITE, LOUISIANA, A CORPORATION OF LOUISIANA

CURVED SEED BOARD FOR COTTON GINS

Application filed April 8, 1929. Serial No. 353,452.

This invention relates to improvements in cotton gins, particularly that part of the apparatus which includes the seed board, sometimes referred to as the finger board or lambrequin, used in the gin to hold the seed in the roll box while the lint is being removed by the action of the saws.

An object of this invention is to provide a device having a means for supporting the roll of cotton in the roll box in a uniform manner and at the same time allow the seed from which the lint has been removed, an unrestricted outlet from the gin. One of the principal objects is to provide a curved seed board without spikes.

Other objects of this invention will appear from the following detailed description and as disclosed in the single sheet of drawings, which is herewith made a part of this application.

In the drawings—

Figure 1:
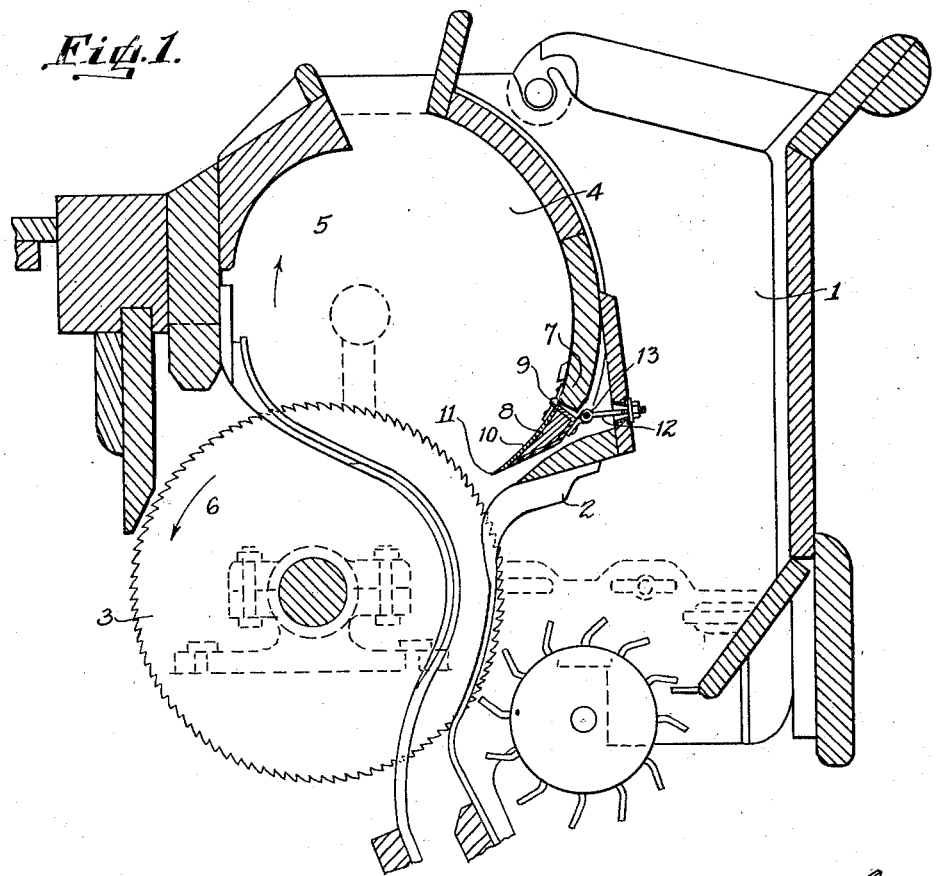
Figure 1 illustrates a vertical sectional view of a double rib huller cotton gin embodying this invention.
Figures 2, 3:
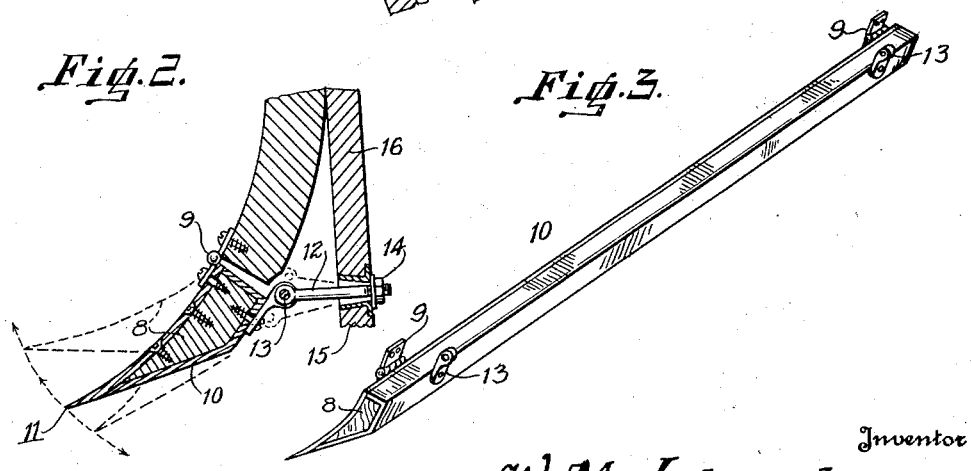
Figure 2 illustrates a sectional view of a portion of the roll box to an enlarged scale and disclosing particularly the curved seed board without spikes.
Figure 3 represents a perspective view of the curved seed board without spikes.

The cotton gin illustrated in this applicaton, apart from the seed board, finger board or lambrequin, is of the usual construction. The apparatus illustrated covers a double rib huller brush gin, but the invention is just as applicable and suitable to a double rib huller air blast gin; to a 12″ plain gin, either brush or air blast; a single rib huller gin, either brush or air blast; and a 10″ plain gin, either brush or air blast. In fact it applies to all types of gins. The front part of the gin is identically the same in either brush or air blast.

This invention involves primarily an improvement in the curved seed board wherein numeral 1 designates the front outer portion of the apparatus into which the cotton to be delinted is fed by any suitable means, while numeral 2 designates a plurality of ribs through which the seed cotton is carried by the saw elements 3. The ribs 2 are spaced a suitable distance apart in such a manner that the seed cotton may be carried therethrough, and after passing through the ribs 2, is carried into the roll box 4, which space is rapidly filled up with the seed cotton in the form of a roll. The roll of cotton is in the box 4, rotated by the action of the saws 3 acting on the lower side of the roll causing it to rotate in the opposite direction to that of the saws, as clearly disclosed by the arrow 5, the direction of rotation of the saws being shown by the arrow 6.

The outer wall 7 of the roll box is fixed, and terminates below the horizontal diameter of the roll. The inner face of this wall is curved, and a board member 8 is hinged or otherwise suitably connected to the lower end of the wall 7 by means such as the hinges 9. The curved board 8, with the wall 7, forms on the inside, a continuous smooth curved surface, and said board is preferably covered in this invention with sheet metal 10 or other suitable material, and formed having a perfectly straight substantially sharp edge 11 arranged equidistant from the edges of the saws 3.

In order that the curved seed board 8 formed without spikes may be moved toward or away from the saws 3, as desired, it is preferred in this invention to provide an adjusting screw 12 pivotally mounted on the curved seed board as at 13, in such a manner that when the nut 14 on the adjusting screw 12 is turned, the seed board 8 will pivot at the hinge point 9. thereby functioning to lift the edge 11 of the seed board upward or downward as may be desired, the adjusting screw 12 being extended through a suitable opening 15 in a portion 16 of the apparatus.

The lifting of the edge 11 of the curved seed board upward will, obviously, decrease the capacity of the roll box 4 and function to tighten the roll of cotton within the box 4; while allowing the edge of the curved seed board to drop downward will increase the capacity of the roll box 4; thus having the effect of forming either a tight or loose roll of cotton within the roll box as may be desired.

In the operation of the gin after the board is adjusted by means of the screw 12, raising the board nearest to the saws upward, the pressure will be increased on the cotton in the roll box 4, this action holding the seed cotton and seed, from which the lint has been removed, longer, allowing them to travel past the saws more often, which functions to give the saws an opportunity for removing all of the lint from the seed.

Numerous benefits and advantages result from the improvement above described, particularly in providing a curved seed board without spikes. A number of the advantages accruing may be noted, as follows:

The use of the curved seed board above described prevents the roll from stopping or breaking, thus preventing the choking of the gin. This results from the fact that the board is approximately with the front of the roll box allowing an even smooth roll, and the bottom of the roll, and from the fact that the roll runs smoother at each end of the gin, it not being possible to put spikes between the last saw and roll box head at edge of gin, and the last spike and the saw have a tendency to cut the roll causing that part of the roll between the last saw and the gin head to have a tendency to fall against the ribs of the roll box and choke.

The use of the curved seed board eliminates the dropping of one seed lock, which dropping results largely from this cotton as it passes in to the roll box at the bottom coming into contact with the spikes of the old type spike seed board and being retarded, thereby this difficulty is eliminated with the curved seed boards without spikes.

The use of the curved seed board prevents seed from dropping out at top of the outside huller ribs, with the hulls, which dropping is caused by the spikes in the old style spike seed board entering the roll and causing this seed to jump out of the roll with the hulls while with the curved seed board, they drop down in proper position in an orderly manner, not being agitated by the spikes.

The curved seed board permits of a more perfect and correct cleaning of the seed in the operation of the gin over the old style spike board. This results from the fact that the curved board allows the roll in the cotton box to revolve in an orderly, even and correct manner without agitation from the spikes, prevents seed from dropping out at the ends of the gin between the last saw and cotton box head where there is no spike, before being cleaned and eliminates the seed dropping out when spikes on the seed board are out of position as is often the case, and in addition thereto, the spikes have a tendency to scratch the bottom of the roll which causes the seed to drop out before being cleaned, while with the curved seed board the smooth even roll without choking enables the seed to pass out only after being cleaned in an orderly manner, and also increases the capacity of the gin over the use of the old type spike board by the fact that the roll operates in a smooth, even and orderly manner. Choking or stopping of the roll is prevented. The seeds are discharged in an orderly manner without interference by spikes, and the continuous roll with the curved seed board insures increased capacity.

The curved seed board improves the sample of cotton being ginned. This results from the lack of interference brought about by the spikes of the old type spike board which scratched the bottom of the roll and had a tendency to interfere with and break the staple of cotton which comes in contact with said spikes, while with the curved seed board without spikes, the roll rotates in a smooth, even and orderly manner without interference from the spikes.

It will be understood that many changes and modifications may be made in the form of the embodiment of the invention within the scope of the following claim without departing from the spirit thereof.

What I claim is:

In a cotton gin of the huller type in which the cotton is fed into the roller box between the saws and the seed board, a roll box, saws having peripheral portions projecting into said roll box, a seed board pivotally mounted at the lower portion of said roll box tapering into a sharp straight knife-like edge outside of the cylinder of revolution of the edges of said saws.

In testimony whereof I affix my signature.

WILLIAM MAURICE JOHNSTON.